United States Patent
Idt et al.

(10) Patent No.: US 9,859,813 B2
(45) Date of Patent: Jan. 2, 2018

(54) POWER CONVERTER AND METHOD FOR SETTING THE OPERATION AND THE START-UP OF A POWER CONVERTER

(71) Applicant: Robert Bosch GmbH, Stuttgart (DE)

(72) Inventors: Andreas Idt, Stuttgart (DE); Dennis Raabe, Cluj-Napoca (RO); Frank Heider, Trochtelfingen (DE); Stefanie Hofmann, Erfurt (DE); Bernd Jochen Kretschmer, Stuttgart (DE); Dennis Gassios, Quirla (DE); Nadja Habermann, Erfurt (DE); Joerg Meisgeier, Waalre (NL); Bernhard Feuchter, Waiblingen (DE); Tobias Mildenstein, Giessen (DE); Daniela Herrmann, Jena (DE); Jan Selbach, Rösrath (DE); Pawlos Kokkinos, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 308 days.

(21) Appl. No.: 14/418,903

(22) PCT Filed: Jul. 24, 2013

(86) PCT No.: PCT/EP2013/065592
§ 371 (c)(1),
(2) Date: Jan. 30, 2015

(87) PCT Pub. No.: WO2014/023574
PCT Pub. Date: Feb. 13, 2014

(65) Prior Publication Data
US 2015/0270785 A1    Sep. 24, 2015

(30) Foreign Application Priority Data

Aug. 9, 2012 (DE) .................. 10 2012 214 177

(51) Int. Cl.
*H02M 7/42* (2006.01)
*H02S 40/32* (2014.01)
(Continued)

(52) U.S. Cl.
CPC ............. *H02M 7/42* (2013.01); *H02M 1/00* (2013.01); *H02M 1/36* (2013.01); *H02S 40/32* (2014.12); *Y02E 10/56* (2013.01)

(58) Field of Classification Search
CPC . H02M 7/42; H02M 1/00; H02M 1/36; H02S 40/32; Y02E 10/56
(Continued)

(56) References Cited

U.S. PATENT DOCUMENTS 5,295,485 A * 3/1994 Shinomura ............. A61B 8/06
                                                    600/443
6,161,184 A * 12/2000 Niimura .................. G06F 21/79
                                                    326/8
(Continued)

FOREIGN PATENT DOCUMENTS

| EP | 2 105 856 | 9/2009 |
|---|---|---|
| EP | 2333658 | 6/2011 |
| WO | WO 2010/091444 | 8/2010 |

OTHER PUBLICATIONS

Markvert, et al. "Grid-connected Systems, IIIc." Practical Handbook of Photovoltaics: Fundamentals and Applications, 2003, Elsevier Advanced Technology, UK, XP002713481, pp. 634-678.
(Continued)

*Primary Examiner* — Brandon S Cole
(74) *Attorney, Agent, or Firm* — Norton Rose Fulbright US LLP; Gerard Messina

(57) ABSTRACT

A power converter, for example, an inverter of a photovoltaic system, is designed to read out an exchangeable memory medium and to carry out an operation setting and/or a
(Continued)

start-up of the power converter in accordance with the settings data, the settings data being read from the exchangeable external memory medium. A method for setting the operation and/or the start-up of a power converter, for example, for setting the operation and/or the start-up of an inverter, is performed in accordance with settings data read from an external memory medium.

19 Claims, 2 Drawing Sheets

(51) Int. Cl.
*H02M 1/00* (2006.01)
*H02M 1/36* (2007.01)

(58) Field of Classification Search
USPC .......................................................... 700/1–89
See application file for complete search history.

(56) References Cited

U.S. PATENT DOCUMENTS

| | | | | |
|---|---|---|---|---|
| 6,766,394 | B1* | 7/2004 | Shimura | G06F 1/1616 710/100 |
| 2004/0164618 | A1* | 8/2004 | Bryde | F02D 19/0647 307/64 |
| 2006/0092588 | A1* | 5/2006 | Realmuto | H02J 1/10 361/62 |
| 2008/0304301 | A1* | 12/2008 | Nishio | H02M 7/487 363/132 |
| 2010/0064146 | A1* | 3/2010 | Boles | G06F 1/26 713/300 |
| 2010/0195361 | A1* | 8/2010 | Stem | H02M 7/5387 363/132 |
| 2010/0202346 | A1* | 8/2010 | Sitzes | H04W 84/18 370/328 |
| 2012/0297210 | A1* | 11/2012 | Yu | G06F 1/26 713/300 |

OTHER PUBLICATIONS

Markvert, et al. "Balance of System Components, IIIb." Practical Handbook of Photovoltaics: Fundamentals and Applications, 2003, Elsevier Advanced Technology, UK, XP002713482, pp. 566-631.
SMA Solar Technology AG: PV-Wechselrichter SUNNY BOY 3000TL / 4000TL / 5000TL Installationsanleitung. Niestetal, 2009. S. 1-76. URL: http://www.gerenda-solar.de/download/Montageanleitung%20SMA%20SB%203000%20-%204000%20-%205000%20TL.pdf (Retrieved Apr. 20, 2015).
TripleLynxInstallationshandbuch Firmenschrift der Danfoss Solar Inverter A/S, Ulsnaes 1, DK-6300 GraatenRev. Dated Nov. 1, 2011. URL: http://www.danfoss.com/NR/rdonlyres/A75905D1-4905-48D3-93A8-029FCE2DDDD0/0/DanfossTLXInstallationManualDEL0041030907_03.pdf (Retrieved Apr. 20, 2015).
International Search Report for PCT/EP2013/065592, dated Oct. 9, 2013.
Markvert, et al. "Grid-connected Systems, IIIc." Practical Handbook of Photovoltaics: Fundamentals and Applications, 2003, Elsevier Advanced Technology, UK, XP002713481, pp. 633-678.
Markvert, et al. "Balance of System Components, IIIb." Practical Handbook of Photovoltaics: Fundamentals and Applications, 2003, Elsevier Advanced Technology, UK, XP002713482, pp. 562-631.

* cited by examiner

POWER CONVERTER AND METHOD FOR SETTING THE OPERATION AND THE START-UP OF A POWER CONVERTER

FIELD OF THE INVENTION

The present invention relates to a power converter, in particular an inverter of a photovoltaic system. The present invention also relates to a method for setting the operation of a power converter.

BACKGROUND

EP 2 105 856 describes a photovoltaic system which may only be started up when an appropriate chip card is inserted into a control unit. A solar module of the photovoltaic system is thus protected against theft.

SUMMARY

The device according to example embodiments of the present invention has the advantage over the related art that the settings on the power converter may be carried out particularly easily, cost-effectively and rapidly and without the need for using other devices, since the settings may be based on a readout of an exchangeable external memory medium.

In an example embodiment, a power converter is designed to carry out an operation setting of the power converter in accordance with settings data read from an exchangeable external memory medium, so that a utilization of the power converter is particularly easy and flexible, since an adaptation of the power converter to different ways of utilization, e.g., to a utilization in different countries having different power grids, is possible with little effort.

Designing the operation setting of the power converter in such a way that a part of the operation setting is the power supply behavior of a power grid interface of the power converter has the advantageous effect that the power converter can be adapted to different power grids particularly easily and is thus utilizable particularly flexibly.

Alternatively or additionally, a test procedure for a system component is furthermore advantageously a part of the operation setting of the power converter, the system component being connected to the power converter. This has the advantageous effect that the test procedure can be flexibly adapted to the technical specifications of the system component and may thus deliver particularly reliable results.

It is furthermore advantageous that, alternatively or additionally, a method for informing the user about the system state of the power converter is a part of the operation setting. The interaction between the user and the system can thus be devised particularly efficiently for the particular user, since the interaction between the user and the system can be adapted to a state of knowledge of the user, for example.

In one advantageous refinement, a mode of operation of the power converter in the event of malfunction is alternatively or additionally a part of the operation setting. In the event of malfunction, the mode of operation can thus be advantageously adapted to the set-up location of the power converter and allows for particularly efficient troubleshooting.

In another advantageous refinement, a mode of operation of a communication interface, in particular a parametrization of a communication address, is alternatively or additionally a part of the operation setting of the power converter. In this way, the power converter can be particularly efficiently adapted to other system components, and can particularly efficiently communicate with the other system components and control them particularly well, since the technical properties of the other system components can be taken into consideration for the mode of operation of the communication interface.

An advantage of a power converter in which, alternatively or additionally, a part of the operation setting is a method for controlling the power converter, is that the control of the power converter is refinable particularly well and a new control can be used by the power converter particularly easily, since an exchange of the method for controlling the power converter can be carried out particularly easily and frequently via the exchangeable external memory medium.

Furthermore, the power converter is designed to start an operation and/or to start a service operating mode during a reading process of the settings data from the exchangeable external memory medium. A start-up of the power converter is thus reliable and can be controlled particularly well, since the exchangeable external memory medium is used for the start-up. A service operating mode can therefore be protected reliably and particularly well against an erroneous activation.

In one advantageous refinement, the power converter is designed to suppress a power supply when the difference between a first amplitude of an alternating voltage and a second amplitude of an alternating voltage and/or between a first frequency of an alternating current and a second frequency of an alternating current exceeds a predefined value. For this purpose, the power converter is designed to measure the first amplitude of an alternating voltage and/or the first frequency of an alternating current in a power grid, which is supplied with power by the power converter, and to read the second amplitude of an alternating voltage and/or the second frequency of an alternating current from the exchangeable external memory medium. An erroneous operation of the power converter is advantageously prevented with the aid of the refinement described above, since erroneous amplitudes of an alternating voltage and/or frequencies of an alternating current that are read from the exchangeable memory medium are detected with the aid of a comparison with the power grid, and the power supply is suppressed.

In one alternative embodiment, the power converter is designed to establish a method for varying an input current at a first system component interface in accordance with the settings data. A setting of a power input at the first system component interface is thus possible particularly efficiently and with particularly good results, since the method for varying the input current can be adapted optimally to connected components, thus allowing for a particularly good basis for setting the power input at the first system component interface.

In one advantageous refinement, the power converter is designed to detect further connected power converters after reading the settings data. The power converter is designed to create a communication address available in a network. An integration of the power converter into a network is possible particularly easily and efficiently in this way, since the creation of the communication address of the power converter takes place at an easily establishable and controllable point in time, namely after reading the settings data.

The power converter is furthermore advantageously designed to carry out a function test of system components in accordance with the settings data, the system components being in connection with the power converter. According to example embodiments of the present invention, errors in connected system components are rapidly detected and downtimes are minimized, since the function test of the system components takes place directly through the power converter in short time intervals without turning off the system, thus dispensing with additional testing devices. The function test may be carried out particularly efficiently in accordance with the settings data, since technical properties of the checked system components can be used for the function test.

An advantage of an example method described below for setting the operation and the start-up of a power converter, in particular an inverter of a photovoltaic system, is that the power converter can be prepared for an operation particularly easily and efficiently and without being dependent on additional devices, since, regardless of the location of operation, only one exchangeable external memory medium is needed for necessary technical settings.

Furthermore, the start-up of the power converter is possible particularly reliably, since the start-up is controllable through the exchangeable external memory medium. The advantages of the device described above apply accordingly to the method described for setting the operation and the start-up of the power converter.

Exemplary embodiments of the present invention are illustrated in the drawings and explained in greater detail in the description below, and further advantages result from the following description of specific embodiments with reference to the figures.

DETAILED DESCRIPTION

In the following, a power converter, in particular an inverter of a photovoltaic system, is described which is designed to read out an exchangeable memory medium and to carry out a setting of an operation and/or a start-up of the power converter in accordance with the settings data, the settings data being read from the exchangeable external medium. Furthermore, a method is described for setting the operation and/or the start-up of a power converter, in particular for setting the operation and/or the start-up of an inverter, the setting of the operation and/or the start-up taking place in accordance with the settings data which are read from an external memory medium.

Figure 1:
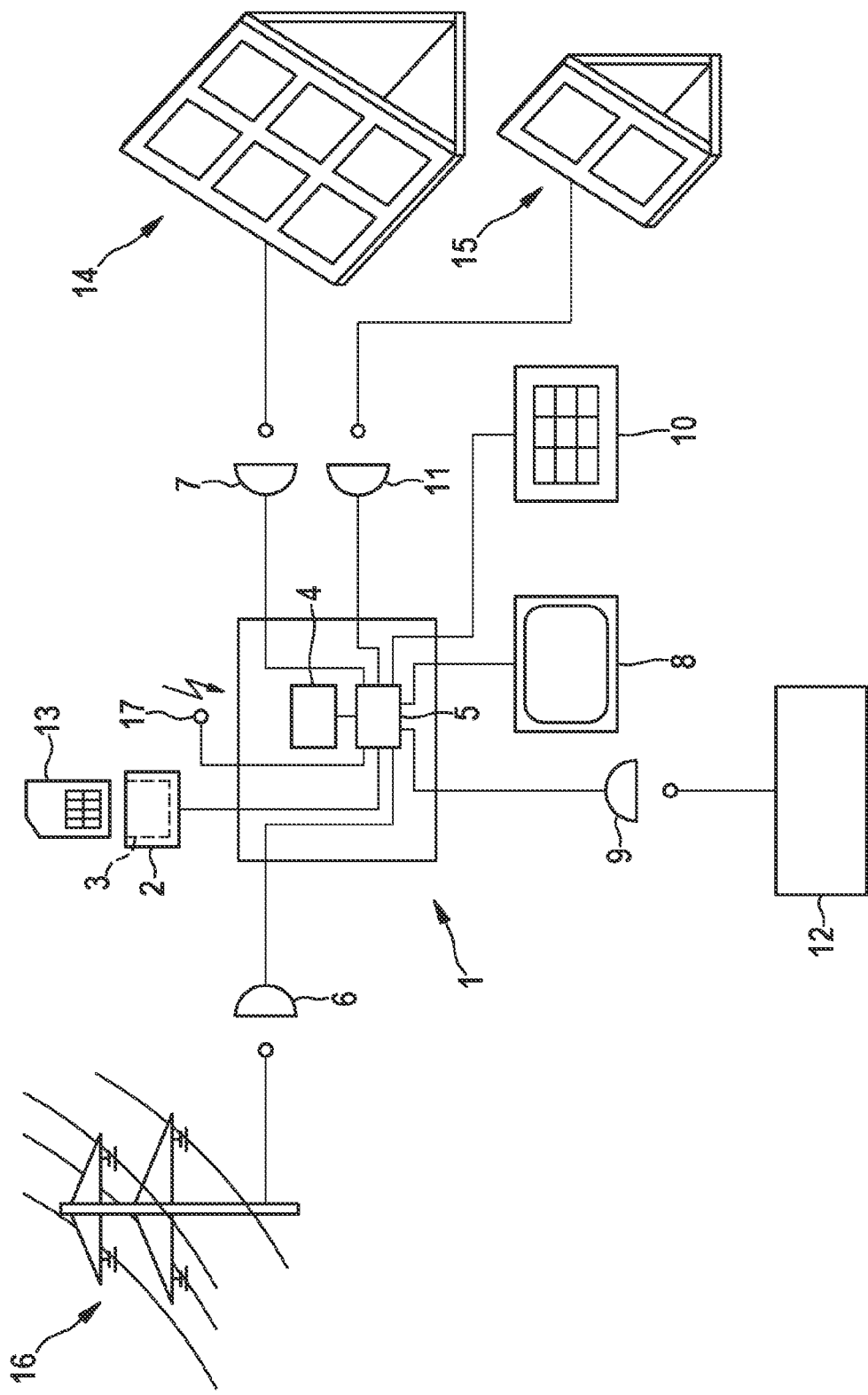
FIG. 1 shows a power converter, which is designed to read out settings data from an exchangeable external memory medium and to carry out a setting of the operation in accordance with the settings data, according to an example embodiment of the present invention.

FIG. 1 shows an example power converter 1, which is designed to read out settings data from an exchangeable external memory medium 13 and to carry out a setting of an operation in accordance with the settings data.

The power converter 1 includes a control circuit 5; an internal memory 4; a card interface 2 including a memory card receptacle 3, which is designed to receive an exchangeable memory medium 13; a first system component interface 7; a second system component interface 11; a power grid interface 6; a network interface 9; an input device 10; and a display device 8. For current supply, power converter 1 is supplied with current via power grid interface 6 and/or power converter 1 also includes a power connection 17 via which power converter 1 is supplied with current.

In a preferred example embodiment, which is illustrated in FIG. 1, control circuit 5 is connected to memory card receptacle 3. Memory card receptacle 3 is designed in such a way that exchangeable memory medium 13 can be inserted by a user and can thus be brought into contact with card interface 2. Memory card receptacle 3 is designed in such a way that it is accessible to the user at an outer face of power converter 1. Furthermore, control circuit 5 is provided with connections to input device 10, display device 8, first system component interface 7, and second system component interface 11, with first system component interface 7 and second system component interface 11 being connected to, respectively, a first solar module 14 and a second solar module 15. Control circuit 5 is also connected to power grid interface 6, which is connected to a power grid 16. Power grid 16 is designed as a public power grid and/or as a private household power grid. Power grid 16 has an alternating current, the alternating current being identified by an amplitude of an alternating voltage, an amplitude of an alternating current intensity, and a frequency of the alternating current. Power grid 16 furthermore has an impedance. A further inverter 12 is connected to network interface 9 to which control circuit 5 is connected. Control circuit 5 is furthermore supplied with current via power connection 17. Alternatively or additionally, power converter 1 is supplied with current via first system component interface 7 and/or via second system component interface 11.

In the preferred example embodiment, which is illustrated in FIG. 1, the power converter 1 is designed as an inverter of a photovoltaic system. In an alternative example embodiment, the power converter 1 is designed as a rectifier or as an inverter. Control circuit 5 of power converter 1 is designed to read settings data from exchangeable memory medium 13 via card interface 2. In the preferred embodiment, control circuit 5 is designed as a microprocessor. A reading process starts when exchangeable memory medium 13 is received by memory card receptacle 3. Alternatively, the reading process starts as soon as power converter 1 is supplied with current via power connection 17 and/or after an input by a user, e.g., via input device 10. In the illustrated example embodiment, control circuit 5 is furthermore designed to transfer a copy of the settings data to internal memory 4. In an alternative example embodiment, internal memory 4 is dispensed with. Power converter 1 is designed to use the settings data directly from exchangeable memory medium 13. Alternatively or additionally, power converter 1 is designed to start a service operating mode upon insertion of exchangeable memory medium 13, the service operating mode being defined as a special operating mode in which additional functionalities are made available. One additional functionality is, for example, the option of carrying out safety-relevant settings of the power converter via input device 10 and display device 8. Safety-relevant settings are, for example, the turn-off behavior of the power converter 1 in the event of overvoltage or the behavior of the power converter 1 in the event of fire. Furthermore, additional internal states of the power converter 1 are displayed via display device 8 during a service operating mode for the purpose of providing a service technician with the option of interacting with power converter 1 in a particular way. For example, the service technician is provided with information about defective components, e.g., about a defective fuse. The service technician may then replace the defective component. Furthermore, a defective execution of computing steps can be displayed. The service technician can then interact with power converter 1 via input device 10 and, for example, initiate a restart of the system. In the illustrated, preferred example embodiment, power converter 1 only carries out a supply of power into power grid 16 if exchangeable memory medium 13 is received by memory card receptacle 3. Power grid interface 6 is in this case designed to supply an alternating current into power grid 16, the alternating current being supplied at a supply voltage, a supply current intensity, a supply frequency, and a supply output. Additionally, a direct current is supplied via power grid interface 6, the direct current being supplied at a direct current intensity and a direct current voltage. The power supply is stopped when exchangeable memory medium 13 is removed from memory card receptacle 3. In one alternative example embodiment, a power supply is also possible without inserting exchangeable memory medium 13. In another alternative example embodiment, power converter 1 starts the power supply as soon as exchangeable memory medium 13 was received by memory card receptacle 3 for the first time. The power supply is continued after removing exchangeable memory medium 13.

Power converter 1 is designed to carry out an operation setting of the power converter 1 in accordance with the settings data, the settings data being read from exchangeable memory medium 13. In particular, the power converter 1 is designed to carry out the method described below for setting the operation and the start-up of the power converter 1.

In one alternative example embodiment, the power converter 1 is designed to carry out a start-up when exchangeable memory medium 13 is brought into contact with card interface 2. Part of the start-up is the beginning of the power supply into power grid 16 via power grid interface 6.

Part of the operation setting of power converter 1 is setting a power supply behavior of power grid interface 6.

Part of the power supply behavior of power grid interface 6 is the amplitude of the supplied alternating voltage and the frequency of the supplied alternating voltage. The amplitude of the supplied alternating voltage and the frequency of the supplied alternating voltage are establishable by power converter 1 in accordance with the settings data. Power converter 1 is designed to establish the amplitude of the supplied alternating voltage and the frequency of the supplied alternating voltage according to the method described below.

Alternatively or additionally, a turn-off condition and a subsequent behavior are establishable as a part of the power supply behavior of power grid interface 6. Power converter 1 is designed to establish the turn-off condition and the subsequent behavior in accordance with the settings data. The turn-off condition establishes a technical state, whereby the power converter suppresses the supply of power via power grid interface 6 when the technical state occurs. The subsequent behavior establishes a technical process that is carried out after the supply of power is suppressed. For example, the turn-off condition is established as an occurrence of an isolated network operation. The isolated network operation is characterized by an unintended supply of power through power converter 1 into a household power grid and a simultaneous separation from a public power grid. Alternatively or additionally, the turn-off condition is established as an exceedance of the supplied direct current intensity and/or of the supplied direct current voltage and/or of the supply frequency of the supplied alternating current. The subsequent behavior establishes, for example, that during a predefined waiting period, the supply of power is suppressed and that at the end of the predefined waiting period, the supply of power is continued.

Alternatively or additionally, a reactive power supply is establishable as part of the supply behavior of power grid interface 6, the reactive power supply being established as a function of the supply voltage of the supplied alternating current. Power converter 1 is designed to establish the reactive power supply as a function of the supply voltage of the supplied alternating current in accordance with the settings data. For example, the reactive power supply is determined through a phase shift between a phase of the supply voltage and a phase of the supply current. Power converter 1 establishes the phase shift in accordance with the settings data.

As part of the power supply behavior, it is alternatively or additionally establishable as to how the power supply takes place via power grid interface 6 when a defect, e.g., a short circuit, occurs in power grid 16. In the preferred example embodiment, power converter 1 is designed to establish, in accordance with the settings data, the supply current intensity or the supply voltage, which are supplied upon occurrence of the defect in power grid 16. Alternatively or additionally, power converter 1 is designed to establish a time duration, the supply current intensity and/or the supply voltage being supplied during the time duration after the occurrence of the defect.

Alternatively or additionally, a supply output is establishable as part of the power supply behavior of power grid interface 6 as a function of the frequency of the alternating current of power grid 16. Power converter 1 is designed to establish the supply output as a function of the frequency of the alternating current of power grid 16 in accordance with the settings data.

In the preferred example embodiment of power converter 1, a behavior of power grid interface 6 is furthermore establishable in the event of a change in the power grid impedance of power grid 16. It is establishable, for example, that, in the event of a change in the power grid impedance by a predefined value, the supply of power into power grid 16 is suppressed.

A further part of the operation setting of power converter 1 is a test procedure for a system component, the system component being connected to the power converter 1. Power converter 1 is designed to establish the test procedure in accordance with the settings data. Furthermore, power converter 1 is designed to carry out the test procedure. In particular, the power converter 1 is designed to establish the test procedure as described in the following description of the method and to carry it out.

In the preferred example embodiment, power converter 1 is furthermore designed to establish a method for informing the user in accordance with the settings data. Furthermore, power converter 1 is designed to inform the user in accordance with the settings data about the system state of the power converter 1 as well as to provide the user with the option of responding to the system state. For example, it is establishable in which way information is presented to the user on display device 8. It is furthermore establishable as to which inputs the user is provided with via input device 10. It is establishable, for example, as to which settings of the power converter 1 are changeable by the user. Overall, a method of a user interaction with the internal system state of the power converter is therefore establishable in accordance with the settings data. Part of the user interaction is, for example, a language used by display device 8 and an internal functionality of power converter 1, which is addressable via input device 10.

The power converter 1 is furthermore designed to establish a mode of operation of the power converter 1 in the event of a malfunction of the power converter 1, the mode of operation being establishable in accordance with the settings data.

For example, it is establishable in accordance with the settings data as to whether, in the event of a malfunction of the power converter 1, an acoustic alarm and/or a visual alarm and/or a notification of a service location and/or a display of an address of a service technician is/are to take place.

Power converter 1 is furthermore designed to establish a mode of operation of network interface 9 in accordance with the settings data. Part of the mode of operation of network interface 9 is a utilization of a communication address. The communication address is establishable in accordance with the settings data. Alternatively or additionally, a data transmission protocol is establishable, the data transmission protocol being used by network interface 9. The data transmission protocol determines a process according to which data are transmitted to further system components via network interface 9. For example, the data transmission protocol determines the method by which data are transmitted to further inverter 12. In the preferred example embodiment, the data transmission protocol is implemented as an IP-CAN protocol or as a ModBus protocol.

In the illustrated example embodiment, power converter 1 is furthermore designed to establish a method for controlling the power converter 1, the method for controlling the power converter 1 being establishable in accordance with the settings data. The method for controlling the power converter 1 establishes, for example, a method for activating internal memory 4 and/or for activating a power semiconductor and/or for activating display device 8 and/or for activating input device 10. A computer program product including program code stored on a computer-readable data carrier, is preferably a part of power converter 1. Power converter 1 is designed to read the computer program product from the exchangeable memory medium. The computer program product is designed for carrying out the method for controlling the power converter when the program product is executed on a computer. For example, control circuit 5 can be designed as a computer for carrying out the method by executing the computer program product.

Power converter 1 is furthermore designed to carry out a method for comparing settings data according to the description below.

Power converter 1 is furthermore designed to establish an optimization method. The optimization method determines a technical process, according to which an input of an electrical power is maximized at first system component interface 7 or at second system component interface 11. The power converter 1 is designed to establish the optimization method in accordance with the settings data. Furthermore, power converter 1 is designed to carry out the optimization method.

In the preferred example embodiment, power converter 1 is furthermore designed to create a communication address in a network after connecting exchangeable memory medium 13 to card interface 2. In particular, the power converter 1 is designed to carry out the below-described method for creating a communication address.

In the preferred example embodiment, exchangeable memory medium 13 is implemented as a memory card. Alternatively, exchangeable memory medium 13 is designed as a flash memory or as a USB stick, or as a diskette, or as a CD. In another alternative example embodiment, card interface 2 is designed to include memory card receptacle 3 as a USB port or as a diskette drive or as a CD drive. In another alternative example embodiment, exchangeable memory medium 13 is designed as an RFID chip and card interface 2 is designed as an RFID sensor for the contactless readout of the RFID chip. The control circuit 5 is advantageously designed as a microprocessor and/or the internal memory 4 is designed as an EP-ROM. In the preferred example embodiment, input device 10 is designed as a keypad. In one alternative example embodiment, input device 10 is designed as a touch-sensitive monitor. In the illustrated specific embodiment, network interface 9 is, for example, an RS485 interface or an Ethernet interface, or a CAN interface.

In one alternative example embodiment, the power converter 1 is an inverter of a domestic power generation system, in particular of a domestic power generation system that includes a Stirling engine and/or a fuel cell and/or a wind turbine.

Figure 2:
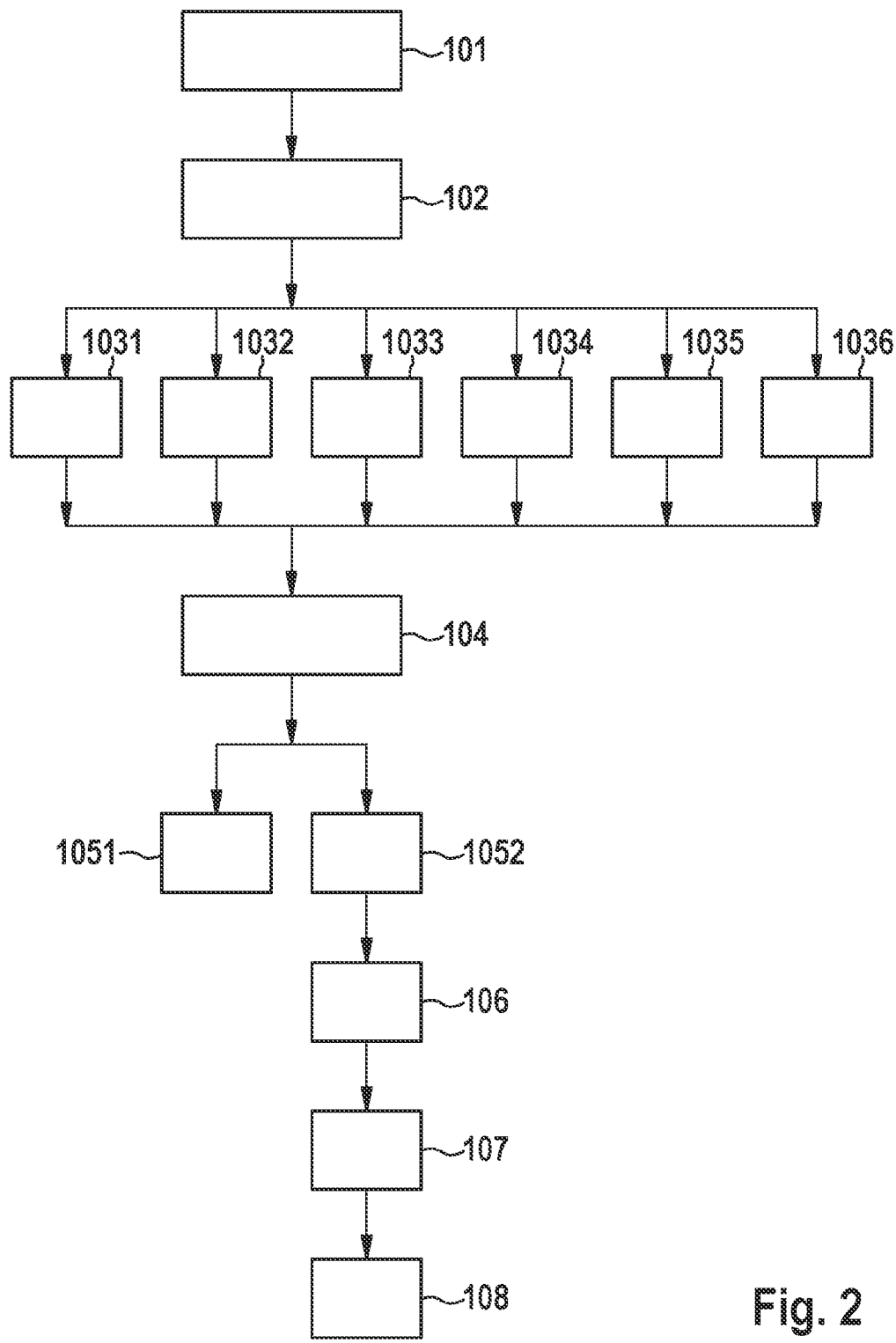
FIG. 2 is a flowchart of a method for setting the operation and/or the start-up of a power converter, according to an example embodiment of the present invention.

FIG. 2 is a flowchart of a method according to an example embodiment of the present invention for setting an operation and a start-up of a power converter, in particular an inverter. The method is, in particular, suited for a power converter and/or an inverter in the preferred specific example embodiment of FIG. 1.

In a first method step 101, the exchangeable memory medium is brought into contact with the card interface. In the illustrated specific example embodiment, establishing the contact of the exchangeable memory medium with the card interface takes place by inserting the exchangeable memory medium into the memory medium receptacle. In a second method step 102, a readout process starts during which the settings data are read out from the exchangeable memory medium via the card interface. In the preferred specific example embodiment, the readout process starts automatically after the exchangeable memory medium has been brought into contact with the card interface. Alternatively, the readout process starts after a command has been input via the input device, for example. The settings data are subsequently checked for correctness. In the preferred example embodiment of the method according to the present invention, the settings data are transferred to the internal memory after a check for correctness. In one alternative specific example embodiment, the settings data are used directly from the exchangeable memory medium for the further method steps.

In third to eighth method steps 1031-1036, a part of the operation setting of the power converter is carried out in accordance with the settings data. Third to eighth method steps 1031-1036 are carried out simultaneously in the preferred specific example embodiment of the method. In one alternative specific example embodiment of the method according to the present invention, third to eighth method steps 1031-1036 are carried out consecutively. Alternatively or additionally, the power converter starts a service operating mode after the exchangeable memory medium is brought into contact with the card interface.

In third method step 1031, the power supply behavior of the power grid interface is established. The power converter retrieves a root-mean-square value of an alternating voltage and a value of an alternating voltage frequency from the settings data. The root-mean-square value of the alternating voltage is used to compute an alternating voltage amplitude. The power converter then configures power grid interface 6 in such a way that the supply of the alternating current takes place according to the alternating voltage amplitude and according to the alternating voltage frequency. In particular, the amplitude of the supplied alternating voltage is selected to equal the value of the computed alternating voltage amplitude and/or the value of the frequency of the supplied alternating voltage is selected to equal the value of the alternating voltage frequency, which was retrieved from the settings data.

Furthermore, the power converter establishes in third method step 1031 the turn-off condition and the subsequent behavior of the power grid interface. For example, the power converter retrieves from the settings data as a turn-off condition the presence of an isolated network operation and/or the presence of a supplied direct current of a predefined intensity and/or the presence of a power supply frequency of a predefined level and/or the presence of a supply voltage of a predefined intensity. Furthermore, the power converter retrieves from the settings data the subsequent behavior, in particular the predefined waiting period, during which the supply of power is suppressed.

In third method step 1031, the power converter moreover establishes the phase shift between the supply voltage and the supply current intensity of the supplied alternating current in accordance with the settings data. By establishing the phase shift, the reactive power supply is established. Alternatively or additionally, a relation is established between the alternating voltage of the power grid and the phase shift in accordance with the settings data.

Part of third method step 1031 is furthermore the establishment of an alternating current that is supplied upon occurrence of a network defect, e.g., a short circuit. The alternating current is established in accordance with the settings data. The inverter furthermore establishes a time duration in accordance with the settings data, the established alternating current being supplied during the time duration after the occurrence of the network defect.

Alternatively or additionally, the power converter furthermore establishes, in third method step 1031, the supply output that is supplied as a function of the frequency of the alternating current of the power grid via the power grid interface. In the preferred specific example embodiment, the power converter establishes a gradient and/or a function in accordance with the settings data, the gradient and/or the function determining how the supply output is computed as a function of the line current frequency.

In the preferred specific example embodiment of the method according to the present invention, the power converter furthermore establishes in third method step 1031 how the supply of power takes place via the power grid interface if a change in the power grid impedance is determined. The power converter establishes, for example, a gradient in accordance with the settings data. The supply of power is suppressed via the power grid interface when the power grid impedance changes in accordance with the gradient or more strongly than the gradient.

In fourth method step 1032, the test procedure of the system component is established, the system component being connected to the power converter. For example, method steps of the test procedure and/or an expected current input and/or an expected voltage input and/or an expected power input and/or an expected response to a test signal is/are read from the exchangeable memory medium as part of the settings data. Alternatively or additionally, a type of the connected component and/or a circuitry of the connected component is/are retrieved from the settings data for the purpose of establishing the test procedure. In particular, a list of the components that are connected to the power converter is retrieved from the settings data. The test procedure is then established in accordance with the settings data. Furthermore, responses of the power converter are established in the event of a passed or a failed test procedure.

In particular, a test procedure is established in accordance with the settings data as described in the following.

In fifth method step 1033, the method for informing the user about the system state is established in accordance with the settings data. The power converter retrieves, for example, a piece of country information from the settings data. The power converter determines in accordance with the country information in which language the internal system states of the power converter are communicated to the user. Furthermore, the power converter determines in accordance with the country information in which form the user may respond via the input device to the displayed internal system state of the power converter. It is established, for example, which internal system states of the power converter may be addressed by the user. Overall, a method of a user interaction with the internal system state of the power converter is therefore established in accordance with the settings data.

In sixth method step 1034, the mode of operation of the power converter is established in the event of a malfunction of the power converter, the establishment taking place in accordance with the settings data. The power converter retrieves from the settings data information as to whether, in the event of a malfunction, an acoustic alarm and/or a visual alarm and/or a notification of a service location and/or a display of an address of a service technician is/are to take place. Furthermore, the power converter retrieves from the settings data an electronic address and/or a phone number of a service technician and/or a mailing address of a service technician and/or a name of a service technician and/or information about one other person. A notification of a service location may take place, for example, via an electronic message, in particular via an e-mail or a text message.

In seventh method step 1035, the mode of operation of the communication interface is established. In particular, a communication address of the communication interface is established, the communication address being retrieved from the settings data. Alternatively or additionally, a data transmission protocol is retrieved from the settings data. The data transmission protocol establishes a method according to which data are transmitted to other system components. For example, the data transmission protocol establishes the method according to which data are transmitted to the other inverter via the network interface.

In eighth method step 1036, the method for controlling the power converter is established in accordance with the settings data. The power converter retrieves from the settings data a first computer program product that includes program code for controlling the power converter. The power converter subsequently checks whether the first computer program product, which is read from the exchangeable memory medium, is designed as a newer version than a second computer program product for controlling the power converter, which is installed on the power converter. If the installed second computer program product is designed as an older version than the first computer program product, the installed second computer program product is replaced by the read first computer program product.

In ninth method step 104, tenth method step 1051, and eleventh method step 1052, the power converter carries out steps for comparing the settings data. In ninth method step 104, the power converter measures a first amplitude of an alternating voltage and a first frequency of an alternating voltage at the power grid, into which the power converter supplies power via the power grid interface. Furthermore, the power converter retrieves from the settings data a second amplitude of an alternating voltage and a second frequency of an alternating voltage, as well as a first predefined value and a second predefined value, the settings data being read from the exchangeable memory medium. The power converter compares the first amplitude of an alternating voltage with the second amplitude of an alternating voltage and computes a first difference value; and/or the power converter compares the first frequency of an alternating voltage with the second frequency of an alternating voltage and computes a second difference value. If the first difference value is greater than the first predefined value and/or if the second difference value is greater than the second predefined value, the power converter proceeds according to tenth method step 1051. In all other cases, the power converter proceeds according to eleventh method step 1052.

In tenth method step 1051, the power converter suppresses the power supply via the power grid interface. Furthermore, an error message is output in tenth method step 1051. The error message may take place acoustically and/or visually and/or as an electronic message. An electronic message is an e-mail or a text message.

In eleventh method step 1052, a start-up of the power converter is carried out. Upon start-up, the power converter begins the power supply into the power grid via the power grid interface. In one alternative example embodiment of the method according to the present invention, the start-up takes place directly after connecting the exchangeable memory medium with the card interface.

In twelfth method step 106, the power converter carries out the method according to the present invention for creating a communication address. The power converter transmits a test signal via the network interface in order to check whether a further component is connected to the network interface. The further other component is, for example, a further power converter or a further inverter. If a further component is detected, the power converter transmits a request for a network identification number of the connected component via the network interface. The power converter then selects for the network interface an identification number that is not yet taken by the further connected component. If a further component is not detected, the power converter selects the identification number "one" for the network interface and assumes the function of a network master in a network. Alternatively or additionally, a communication address value is retrieved from the settings data and the communication address is established according to the communication address value.

In thirteenth method step 107, the test procedure of the system component is carried out, the system component being connected to the power converter. The system component that is connected to the power converter is, for example, designed as the first solar module, the first solar module being connected to the power converter via the first system component interface. The test procedure checks for proper operation of the first solar module. For example, a current input and/or a voltage input at the first system component interface is/are compared with an expected current input and/or an expected voltage input at the first system component interface. The expected current input and/or the expected voltage input were retrieved from the settings data when establishing the test procedure. Alternatively or additionally, the system component that is connected to the power converter is designed as a further power converter or as a further inverter. For checking purposes, the power converter transmits a test signal via the network interface to the further power converter or inverter and compares a response from the further power converter or inverter with an expected response. The test signal and the expected response were retrieved from the settings data when establishing the test procedure. Alternatively or additionally, the power converter creates a first list of the components that are connected to the power converter. The power converter compares the first list of the components that are connected to the power converter with the second list of the components that are connected to the power converter, the second list being retrieved from the settings data when establishing the test procedure. In the event of a failed test procedure, an acoustic and/or a visual and/or a further warning take(s) place. The warning was established in accordance with the settings data when establishing the test procedure.

In fourteenth method step 108, the power converter establishes the optimization method according to which the input of the electrical power at the first system component interface or at the second system component interface is maximized. As part of the optimization method, the power converter establishes a method in accordance with the settings data according to which the input current is varied at the first system component interface. For example, different measuring points are recorded as part of the optimization method, where a measuring point is composed of an input current intensity, and an input voltage and the input current intensity are established for at least one measuring point in accordance with the settings data. In particular, the power converter uses technical data of the component that is connected to the first system component interface and/or of the component that is connected to the second system component interface to establish the optimization method, the technical data being part of the settings data. Furthermore, a method for selecting a measuring point from the different measuring points is established in accordance with the settings data. It is established, for example, that that measuring point selected is one identified by the greatest product of input current to input voltage. An optimal input current is established as the input current of the selected measuring point.

The power converter then carries out the optimization method. The power converter sets the optimal input current at the first system component interface and/or at the second system component interface.

In one alternative specific example embodiment of the method according to the present invention, the method steps are carried out in a different sequence or only individual method steps of the ones described are carried out.

What is claimed is:

1. An inverter of a photovoltaic system, comprising:
an interface via which the inverter is configured to read data out from an exchangeable external memory medium; and
processing circuitry configured to carry out an operation setting of the inverter in accordance with settings data of the data read from the exchangeable external memory medium,
wherein the operation setting includes setting a power supply behavior of a power grid interface of the inverter, and
wherein the inverter is configured to at least one of:
suppress a power supply when a difference between a first amplitude of an alternating voltage and a second amplitude of an alternating voltage exceeds a predefined first value, the second amplitude being read by the inverter from the exchangeable external memory medium, or
suppress a power supply when a difference between a first frequency of an alternating voltage and a second frequency of an alternating voltage exceeds a predefined second value, the second frequency being read by the inverter from the exchangeable external memory medium.

2. The inverter of claim 1, wherein the operation setting includes at least one of: a test method of a system component that is connected to the inverter, a method for informing a user about a system state of the inverter, a mode of operation of the inverter when a malfunction occurs, a mode of operation of a network interface of the inverter, or a method for controlling the inverter.

3. The inverter of claim 1, wherein the operation setting includes a parameterization of a communication address for a network interface of the inverter.

4. The inverter of claim 1, wherein the processing circuitry is configured to establish a method for varying an input current at a first system component interface of the inverter in accordance with the settings data.

5. The inverter of claim 1, wherein the processing circuitry is configured to carry out a function test of system components in accordance with the settings data, the system components being in connection with the inverter.

6. The inverter of claim 1, wherein the processing circuitry is designed to:
   detect, after reading the settings data, components that are connected to a network interface of the inverter; and
   create a communication address, which is available in a network.

7. The inverter of claim 1, wherein the inverter is configured to start at least one of an operation and a service operating mode during a reading of, and in accordance with, settings data read from the exchangeable external memory medium.

8. The inverter of claim 1, wherein the external memory medium is a memory card.

9. The inverter of claim 1, wherein the inverter carries out, as a function of the read out data, or a start-up of the inverter.

10. A method for an inverter of a photovoltaic system comprising:
   obtaining, by processing circuitry of the inverter, data read from an exchangeable external memory medium over an interface of the inverter to the external memory medium, the data including settings data;
   setting, by the processing circuitry, an operation of the inverter in accordance with the obtained settings data, wherein the setting the operation includes setting a power supply behavior of a power grid interface of the inverter; and
   performing at least one of:
      measuring a first amplitude of an alternating voltage in a power grid supplied with current, wherein the read data includes a second amplitude of an alternating voltage and a first predefined value; determining, by the processing circuitry, a difference between the first and second amplitudes; and suppressing, by the processing circuitry, a power supply in response to the determined difference exceeding the first predefined value; or
      measuring a first frequency of an alternating current in a power grid supplied with current, wherein the read data includes a second frequency of an alternating current and a second predefined value; determining, by the processing circuitry, a difference between the first and second frequencies; and suppressing, by the processing circuitry, a power supply in response to the determined difference exceeding the second predefined value.

11. The method of claim 10, wherein the operation setting includes at least one of: a test method of a system component that is connected to the inverter, a method for informing a user about a system state of the inverter, a mode of operation of the inverter when a malfunction occurs, a mode of operation of a network interface of the inverter, or a method for controlling the inverter.

12. The method of claim 10, wherein the operation setting includes a parameterization of a communication address for a network interface of the inverter.

13. The method of claim 10, wherein the setting of the operation includes carrying out, by the processing circuitry, a function test of system components in accordance with the settings data, the system components being connected to the inverter.

14. The method of claim 10, wherein the setting of the operation includes establishing, by the processing circuitry, a method for varying an input current at a first system component interface of the inverter in accordance with the settings data.

15. The method of claim 10, further comprising starting, by the processing circuitry, at least one of an operation and a service operating mode during the reading of, and in accordance with, the settings data.

16. The method of claim 10, further comprising:
   measuring the first amplitude of the alternating voltage and the first frequency of the alternating current in the power grid supplied with current;
   determining, by the processing circuitry, the difference between the first and second amplitudes;
   determining, by the processing circuitry, the difference between the first and second frequencies; and
   suppressing, by the processing circuitry, the power supply in response to the determined difference between the first and second amplitudes exceeding the first predefined value and the determined difference between the first and second frequencies exceeding the second predefined value.

17. The method of claim 10, wherein the external memory medium is a memory card.

18. The method of claim 10, further comprising carrying out, by the inverter as a function of the read out data, a start-up of the inverter.

19. The method of claim 10, wherein the inverter performs power inversion.

* * * * *